United States Patent [19]
Otsuka

[11] Patent Number: 5,384,836
[45] Date of Patent: Jan. 24, 1995

[54] FACSIMILE APPARATUS AUTOMATICALLY REGISTRABLE OF IDENTIFICATION NAME

[75] Inventor: Kazutaka Otsuka, Hachioji, Japan

[73] Assignees: Casio Electronics Manufacturing Co., Ltd.; Casio Computer Co., Ltd., both of Tokyo, Japan

[21] Appl. No.: 841,050

[22] Filed: Feb. 25, 1992

[30] Foreign Application Priority Data

Mar. 19, 1991 [JP] Japan ................... 3-054429

[51] Int. Cl.6 ............... H04M 3/00; H04M 11/00
[52] U.S. Cl. ................... 379/100; 379/93; 379/96; 379/354; 379/356; 358/440
[58] Field of Search .............. 379/100, 96, 97, 93, 379/354, 355, 356, 142, 396; 364/479; 358/440

[56] References Cited

U.S. PATENT DOCUMENTS

| | | | |
|---|---|---|---|
| 4,279,022 | 7/1981 | Abe | 364/918 |
| 4,431,870 | 2/1984 | May et al. | 379/354 |
| 4,583,124 | 4/1986 | Tsuji et al. | 358/256 |
| 4,613,907 | 9/1986 | Yoshimoto et al. | 358/257 |
| 4,764,951 | 8/1988 | Kotani et al. | 379/100 |
| 4,787,050 | 11/1988 | Suzuki | 364/479 |
| 4,829,559 | 5/1989 | Izawa et al. | 379/100 |
| 4,833,705 | 5/1989 | Kobayashi | 379/100 |
| 4,870,503 | 9/1989 | Miura | 379/100 |
| 4,899,377 | 2/1990 | Bauer et al. | 379/354 |
| 4,924,496 | 5/1990 | Figa et al. | 379/142 |
| 4,956,860 | 9/1990 | Murata | 358/440 |
| 5,021,889 | 2/1990 | Yamamoto | 379/100 |
| 5,134,653 | 7/1992 | Satomi et al. | 379/354 |

FOREIGN PATENT DOCUMENTS 0079465 5/1983 European Pat. Off. .
60-68768 4/1985 Japan .

Primary Examiner—John K. Peng
Assistant Examiner—Daniel J. Wu
Attorney, Agent, or Firm—Frishauf, Holtz, Goodman & Woodward

[57] ABSTRACT

A facsimile apparatus receives identification data identifying a particular destination terminal, at the time of transmitting document data to the destination terminal via a telephone line. A memory unit stores, as a data pair, a facsimile number input by manual dialing, and the identification data returned from the destination terminal. A display unit displays the identification data. A selection unit selects one of the identification data displayed on the display means. A line connecting unit reads out a facsimile number stored in the memory means and corresponding to the selected identification data, and connects the facsimile apparatus to a telephone line corresponding to the readout facsimile number.

6 Claims, 4 Drawing Sheets

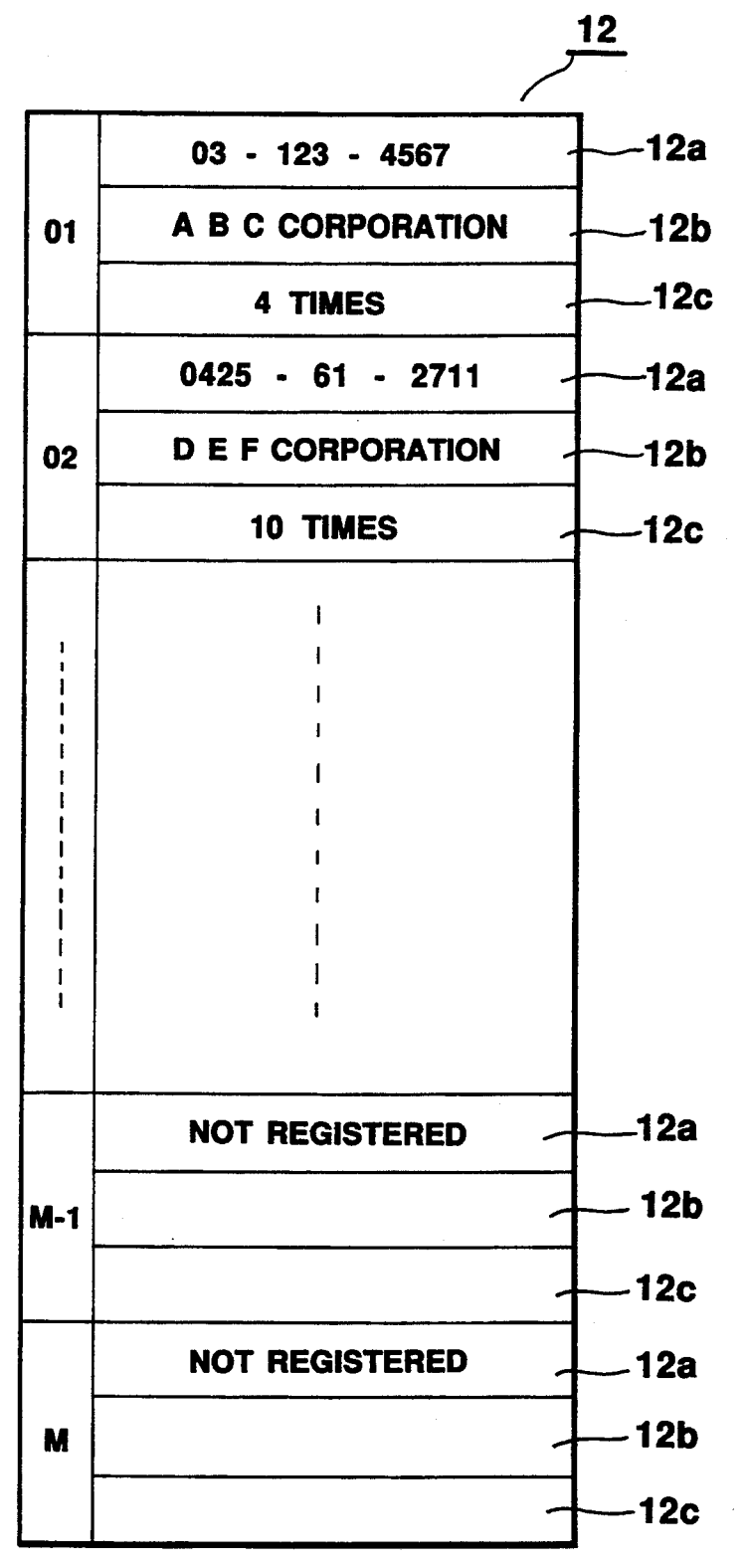

|    |                    |       |
|----|--------------------|-------|
| 01 | 03 - 123 - 4567    | —12a  |
|    | A B C CORPORATION  | —12b  |
|    | 4 TIMES            | —12c  |
| 02 | 0425 - 61 - 2711   | —12a  |
|    | D E F CORPORATION  | —12b  |
|    | 10 TIMES           | —12c  |
| M-1 | NOT REGISTERED    | —12a  |
|    |                    | —12b  |
|    |                    | —12c  |
| M  | NOT REGISTERED     | —12a  |
|    |                    | —12b  |
|    |                    | —12c  |

FIG. 2

FACSIMILE APPARATUS AUTOMATICALLY REGISTRABLE OF IDENTIFICATION NAME

BACKGROUND OF THE INVENTION

1. Field of the Invention

This invention relates to a facsimile apparatus having a compacted-dial function, and more particularly to a facsimile apparatus which can automatically store facsimile numbers (or telephone numbers), etc., input by the operator.

2. Description of the Related Art

In recent years, facsimile apparatuses have been used universally, and various types of facsimile apparatuses including a facsimile apparatus made integral with a telephone as one piece are put on the market. Further, a facsimile apparatus has been proposed which has a function of registering in the memory thereof facsimile numbers of destinations with which communication is often performed, and of automatically dialing a desired one of the registered facsimile numbers by one-touch key operation.

In the conventional facsimile apparatuses, register operation of facsimile numbers is performed by the operator with the use of e.g. ten keys. Specifically, the operator sees a table describing correspondency between the facsimile numbers and one-touch keys, to push one of the keys at the time of performing facsimile transmission.

However, in the conventional facsimile apparatus, the user must register facsimile numbers in the apparatus, and describe the correspondency between the facsimile numbers and one-touch keys on the table, which makes register operation very troublesome.

Moreover, since even facsimile numbers or other data of destinations which were once registered and are now out of use remain in the memory so long as the operator does not erase them, the operator himself must erase infrequently-used data when the memory becomes full. Thus, there was a case where he erroneously erased frequently-used data.

SUMMARY OF THE INVENTION

It is the object of the invention to provide a facsimile apparatus capable of performing register operation of data such as identification names and facsimile numbers of destinations, and of reliably erasing data in the order from infrequently-used data when the memory of the apparatus becomes full.

To attain the object, the facsimile apparatus of the invention, which receives identification data, for identifying a particular destination terminal, at the time of transmitting document data to the destination terminal via a telephone line, comprises:

memory means for storing, as a data pair, a facsimile number input by manual dialing, and the identification data returned from the destination terminal;

display means for displaying the identification data stored in the memory means;

selection means for selecting one of the identification data displayed on the display means;

line connecting means for reading out a facsimile number stored in the memory means and corresponding to the selected identification data, and connecting the facsimile apparatus to a telephone line corresponding to the read-out facsimile number.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a view, useful in explaining the structure of a memory incorporated in the apparatus of FIG. 1;

DETAILED DESCRIPTION OF THE PREFERRED EMBODIMENT

The invention will be explained in detail with reference to the accompanying drawings showing an embodiment thereof.

Figure 1:
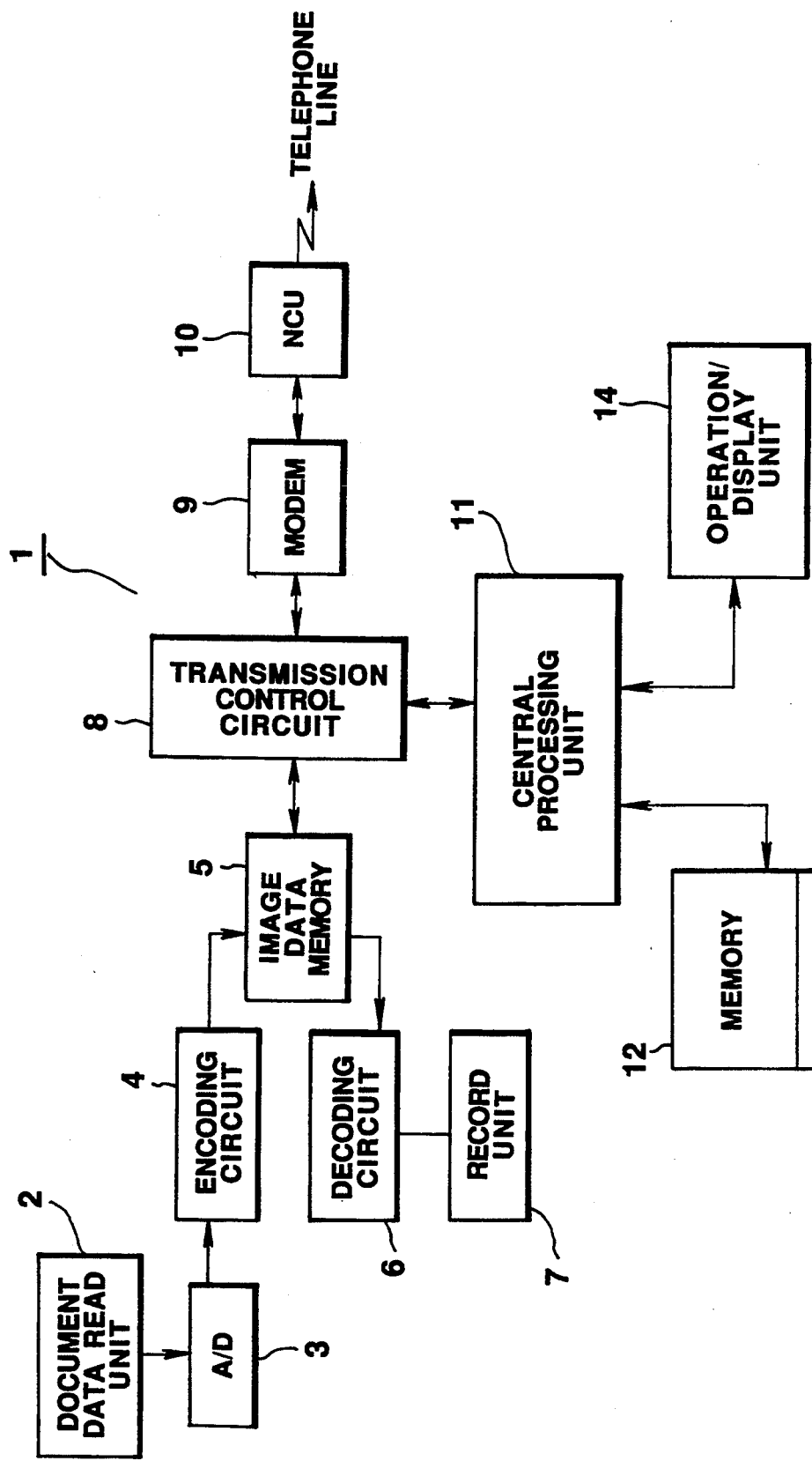
FIG. 1 is a block diagram, showing a facsimile apparatus according to an embodiment of the invention.

FIG. 1 shows the structure of the facsimile apparatus of the invention. The facsimile apparatus 1 comprises a document data-read unit 2, an analog/digital converter (hereinafter called "A/D converter") 3, an encoding circuit 4, an image data memory 5, a decoding circuit 6, a recording unit 7, a transmission control circuit 8, a modem 9, an NCU (Network Control Unit) 10, a central processing unit (CPU) 11, a memory 12, a buffer 13, and an operation/display unit 14. The document data-read unit 2 reads in document data by a CCD sensor at the time of transmitting the document data to a destination, and then outputs the read-in data to the A/D converter 3. The converter 3 converts the document data to a digital bit line, and outputs the converted data to the encoding circuit 4. The circuit 4 compresses and outputs the data to the image data memory 5. The memory 5 stores the data, and outputs the stored data to the transmission control circuit 8 in accordance with a transmission command signal supplied from the CPU 11. The circuit 8 outputs the data to the modem 9, which in turn subjects the data to digital/analog conversion, and outputs the converted data to the NCU 10. The NCU 10 is a device for connecting the facsimile apparatus of the invention, which serves as a terminal, to a telephone line, and thus transmitting the data to a destination via the telephone line.

On the other hand, regarding incoming data to the facsimile apparatus 1, the data is received by the NCU 10 via the telephone line, and is then subjected to analog/digital conversion by the modem 9. The digital data demodulated by the modem 9 is temporarily stored in the image data memory 5 via the transmission control circuit 8, and is thereafter output to the decoding circuit 6, where it is demodulated from compressed data (compressed by an encoding circuit incorporated in a facsimile apparatus on the side of a destination/to a digital bit line. The demodulated data is printed on a sheet of paper by the recording unit 7 through an electrostatic recording method.

Figure 3:
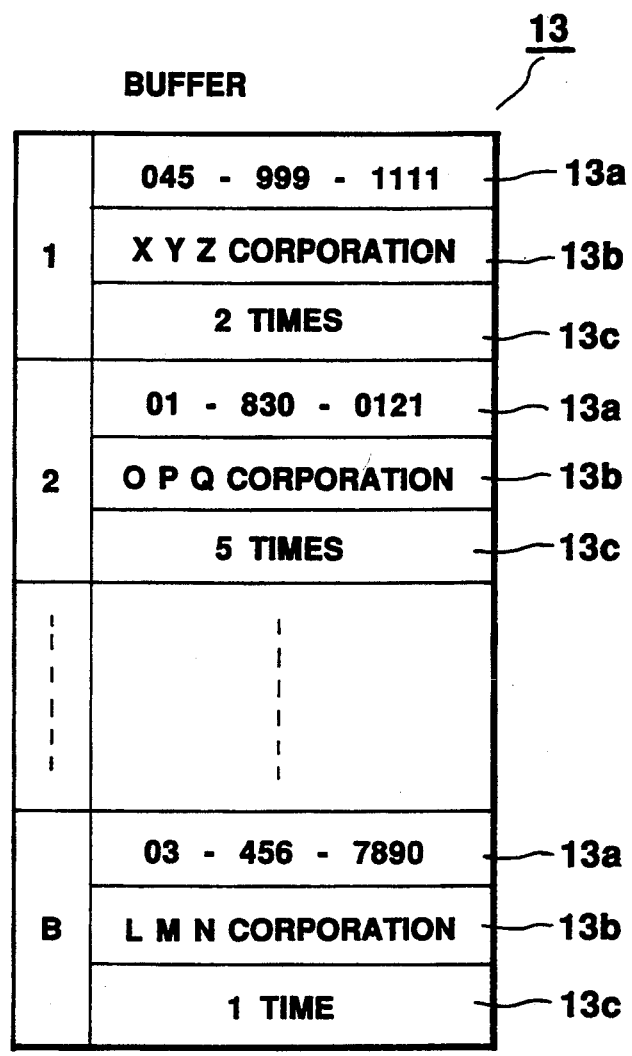
FIG. 3 is a view, useful in explaining the structure of a buffer incorporated in the apparatus of FIG. 1.

The memory 12 and buffer 13 are provided for performing efficient transmission, and storing data such as the facsimile numbers and identification names (e.g. corporation and/or persons's names) of destinations, and data indicative of the number of times at which each data set is accessed. FIG. 2 shows the memory 12, and FIG. 3 shows the buffer 13. In FIG. 2, each of regions having addresses 01 - M consists of three memory areas 12a–12c. The area 12a stores a facsimile number, the area 12b an identification name, and the area 12c the number of times at which the address is accessed, i.e., data regarding frequency in use. Similarly, in FIG. 3, each of regions having addresses 1 - B consists of three areas 13a–13c, the area 13a storing a facsimile number, the area 13b an identification name, and the area 13c the number of times at which the address is accessed. Though the memory 12 and buffer 13 are shown in separate drawings, they may be incorporated in a single memory, and provided in different memory areas of the same. Data are determined, based on the number of times at which they are used, whether they should be stored in the memory 12 or in the buffer 13. Specifically, frequently-used data is stored in the memory 12, while infrequently-used data is stored in the buffer 13. The memory 12 and the buffer 13 may be backed up by batteries or so, or may consist of non-volatile memories such as EEPROMs in which data are not erased even if the apparatus is turned off.

Figure 4:
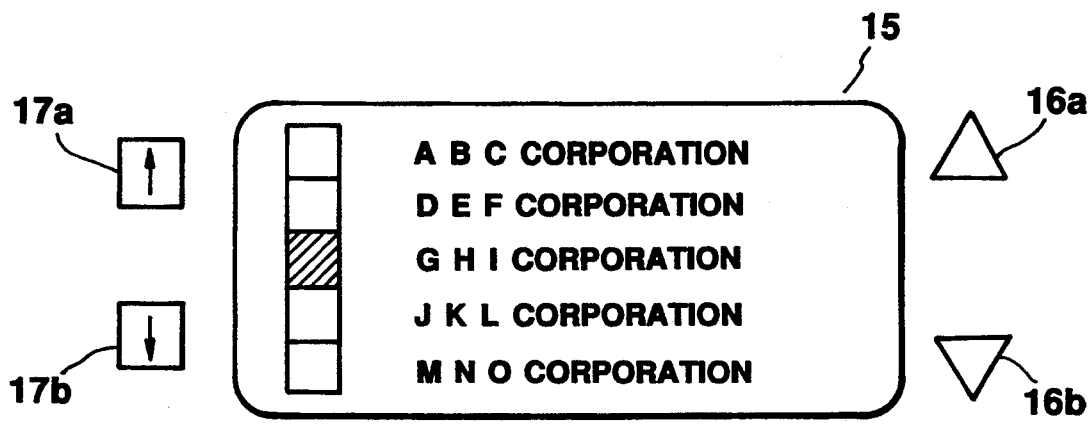
FIG. 4 is a view, showing part of an operation/display unit incorporated in the apparatus of FIG. 1.

The operation/display unit 14 is connected to the CPU 11, and comprises a transmission button, ten keys, scroll keys, cursor-moving keys, and a liquid crystal display for displaying the codes of destinations at the time of transmission of data, or for displaying the identification names of the destinations in the alphabetic order or in the order of the Japanese syllabary. FIG. 4 shows a liquid crystal display 15 and keys provided around the display. The display 15 displays identification names such as corporation names stored in the memory 12 or buffer 13. The display 15 is disposed such that the screen is scrolled in the vertical direction by operating scroll keys 16a and 16b, and that a desired destination is designated by operating cursor keys 17a and 17b which can designate a desired one of the identification names of destinations.

The CPU 11 incorporates a ROM and a RAM therein, and controls the facsimile apparatus 1 on the basis of a program stored in the ROM. The RAM is used for reading in data such as an identification name, facsimile number, etc. which are necessary for the CPU 11 to perform processing, and temporarily storing them.

The procedure of GIII mode transmission, registered in the CCITT (International Telegraph and Telephone Consultative Committee), and performed by the facsimile apparatus 1 constructed as above, will be briefly explained.

The transmission procedure of the facsimile apparatus 1 comprises five steps named phases 1-5, respectively. In the phase 1, the apparatus 1 is connected to the telephone line of a facsimile apparatus on the side of a destination, via the circuit of a telephone (not shown) connected to the NCU 10, by using, for example, the dial of the telephone. Then, in the phase 2, processings such as functional identification, phase locking (training), etc. are performed between the facsimile apparatuses, thereby performing matching therebetween. At this time, the apparatus on the destination side outputs a nonstandard functional identification signal (NSF) indicative of data containing its identification name, and a signal indicative of confirmation of reception standby (CFR). The NSF is a signal containing data for identifying the request of a specified user which does not fall within a range defined by the CCITT. This signal includes an FIF (Facsimile Information Field) having an area for registering desired binary code data which includes data indicative of a transmitter (e.g. the name of a person or corporation), so as to send it to a receiver (though the data indicative of a transmitter is not necessarily registered since such registration is not standardized).

In the invention, however, it is a premise to register data indicative of a transmitter in the NSF signal.

On the other hand, the CFR signal indicates that the procedure necessary before data is transmitted has been completed, and hence that data transmission can start at any time.

In the next phase 3, data is actually transmitted. Specifically, data on the first page of documents are transmitted from the facsimile apparatus 1 to a destination after a training signal is transmitted thereto. when the first page data has been transmitted, a signal RTC indicating that the first page data has been received is transmitted from the destination.

In a phase 4, a signal indicating that all data transmission has been completed, or indicating that the data transmission is continued is output from the facsimile apparatus 1, and then a response signal indicating that the signal supplied from the apparatus 1 is received is output from the destination to the apparatus 1. In this phase, if the apparatus 1 transmits two or more documents, it beforehand outputs a multi-page signal MPS indicating that a plurality of pages will be transmitted. Each time the multi-page signal is output, the processing in the phase 3 is repeated. In the last phase 5, the apparatus 1 outputs a signal DCN instructing turn-off of the line, thereby terminating the data transmission.

Figure 5:
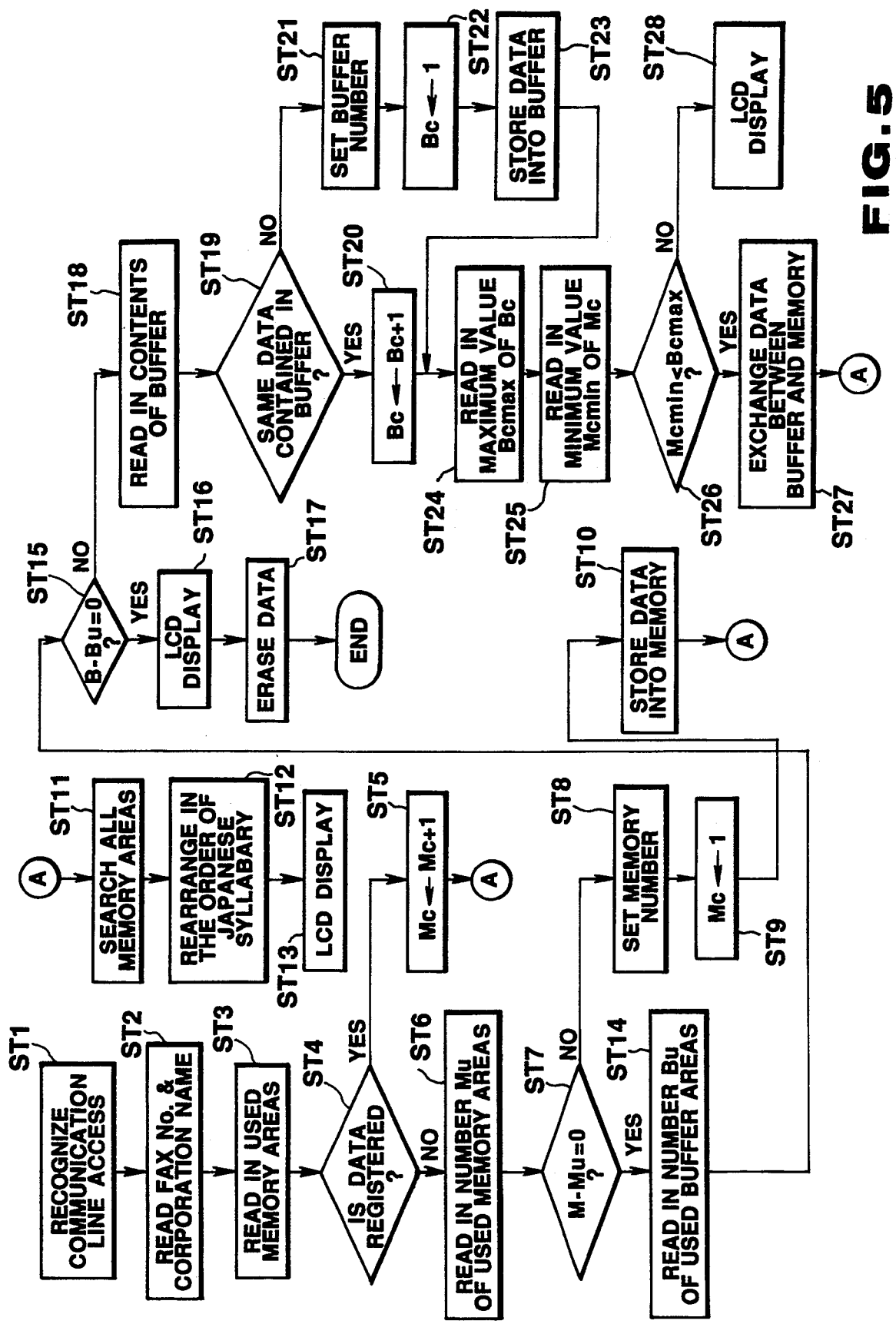
FIG. 5 is a flowchart, useful in explaining the operation of the apparatus of FIG. 1.

Then, the operation of the apparatus 1 will be explained in more detail by using the flowchart of FIG. 5. The apparatus 1 is characterized in that a facsimile number of a new destination, input therein by manual dialing, is automatically registered in the memory of the apparatus, together with identification data for identifying the destination, which is contained in the nonstandard functional identification signal (NFS) returned from the destination upon dialing thereto. Further, it is characterized in that the number of times at which each data set consisting of a facsimile number and corresponding identification data is accessed to transmit data to a corresponding destination is checked, thereby erasing infrequently-used data in a reliable manner.

First, to start to transmit data to a destinations, the facsimile number of the destination is dialed via a telephone circuit (not shown) connected to the NCU 10. At this time, if data is transmitted to a destination to which data transmission has been performed one or more times, dialing to this destination is automatically performed only by designating the identification name thereof displayed on the liquid crystal display 15, by virtue of an automatic dialing function hereinafter referred to. If, on the other hand, data is transmitted to a destination for the first time, the user inputs the facsimile number of the destination by operating the ten keys of the operation/display unit 14 in the manner described in the phase 1. Upon receipt of a response from the destination, the NCU 10 connects the telephone line to the modem 9. The CPU 11 recognizes the access to the telephone line (Step ST1).

Then, the CPU 11 controls the transmission circuit 8 to cause the RAM to read in the facsimile number of the destination output by automatic or manual dialing via the telephone, and identification name data returned as the nonstandard identification signal NSF from the destination (step ST2). The CPU 11 causes the RAM to read in data stored in the memory 12 (step ST3), and compares both data read in the RAM to determine that the facsimile number of the destination now input is registered in the memory 12 (step ST4). If the facsimile number is registered in the memory 12, i.e., if the answer to the question of step ST4 is Yes, the number of times of use stored in the memory area 12c of a region having an address relating to the destination is increased by 1 (ST5). If, on the other hand, the input facsimile number is not registered in the memory 12, i.e., if the answer to the question of the step ST4 is No, the maximum address number Mu of used areas in the memory 12 is searched and read into the RAM (step ST6). Then, it is determined in step ST7 whether or not the number Mu is equal to the maximum address number M of the memory 12, so as to determine whether or not any unused memory areas remain. If it is determined that there are one or more unused areas in the memory 12, i.e., the answer to the question of step ST7 is No, a new address number (Mu+1) is set as the maximum address number Mu of used areas in step ST8, and "1" is set in a counter Mc in the RAM in step ST9. Thereafters, the input facsimile number, a corresponding identification name, and data Mc are registered as one set in a new address region (step ST10).

Subsequently, the CPU 11 searches identification name data stored in the memory 12, rearranges them in the alphabetic order or in the order of the Japanese syllabary (steps ST11 and ST12), and displays them on the liquid crystal display 15 (step ST13). This display processing is performed as shown in FIG. 4.

On the other hand, if no unused areas remain in the memory 12 as a result of repeatedly transmitting data to new destinations performed by manual dialing, i.e., if the answer to the question of the step ST7 is Yes, the CPU 11 reads in the maximum address number Bu of unused memory areas in the buffer 13 (step ST14), and then determines whether or not the number Bu is equal to the maximum address number B of the buffer 13 (step ST15). That is, it is determined whether or not any unused areas remain in the buffer 13. If the answer to the question of step ST15 is Yes, it is determined that the buffer 13 is also full of data, and data stored in the buffer 13 are displayed on the liquid crystal display 15 so as to erase data of destinations in the order from the most unnecessary one by the operator (step ST16). The operator presses the scroll keys 16a and 16b and cursor keys 17a and 17b, thereby subsequently displaying data of destinations on the display 15, and selectively erasing unnecessary data ( step ST17). At this time, on the display 15, an identification name which should be erased first of all is indicated by flickering light.

If there are any unused areas in the buffer 13. i.e., if the answer to the question of step ST15 is No, the CPU 11 cause the RAM to read in the data stored in the buffer 13 (step ST18), and compares both data read in the RAM to determine that the input facsimile number is registered in the buffer 13 (step ST19). If the input facsimile number is registered in the buffer 13, i.e., if the answer to the question of step ST19 is Yes, the number of times of use stored in the memory area 13c of a region having an address relating to the destination is increased by 1 (step ST20). If, on the other hand, the input facsimile number is not registered in the buffer 13, i.e., if the answer to the question of the step ST19 is No, the minimum address number Bu of unused areas in the buffer 13 is set as a new address number (step ST21), and "1" is set in a counter Bc in the RAM (step ST22). Thereafter, the input facsimile number, a corresponding identification name, and data Bc are registered as one set in a new address region Bu (step ST23).

Then, the CPU 11 reads, from the buffer 13, the most-accessed data which is determined on the basis of the values in the memory areas 13c (step ST24), and also reads, from the memory 12, the least-accessed data which is determined on the basis of the values in the memory areas 12c (step ST25). If it is determined that the data selected from the buffer 13 is accessed more often than that selected from the memory 12, the former data is stored in the memory 12, and the latter data is stored in the buffer 13 (steps ST26 and ST27). On the other hand, if it is determined in the step ST26 that the data selected from the buffer 13 is accessed less often than that selected from the memory 12, the data are remained as they are, and the liquid crystal display 15 informs the operator of the fact that the data relating to the new destination has not formally been registered in the memory (step ST28). In addition, after the processing in the step ST27, the CPU 11 searches the data stored in the memory 12, rearranges them in the alphabetic order or in the order of the Japanese syllabary, and displays them on the display 15 (steps ST11-ST13).

It is a matter of course that the facsimile number of a destination can be easily read out of the memory 12, and automatically dialed only by operating the scroll keys 16a and 16b and cursor-moving keys 17a and 17b and thus selecting the identification name of the destination.

As is described above, the invention can provide a technique of registering those data of a destination which contain an identification name, only by inputting the facsimile number of the destination, since the technique utilizes a nonstandard functional identification signal NSF supplied from the destination. Further, data registered in the memory 12 and buffer 13 are rearranged in the order from the least used data. Infrequently-used data are displayed on the operation/display unit 14, and hence can be selectively erased by the operator.

Though in the embodiment, the identification name of a destination is registered using a nonstandard functional identification signal NSF from the destination, the invention is not limited to this, but may be constructed such that a compacted name of a destination or the like is registered, in a case where such a facsimile apparatus as supplies the compacted name is used at the destination.

Moreover, through in the embodiment, identification names are rearranged in alphabetic order or in the order of the Japanese syllabary, it is a matter of course to modify the invention without departing from the scope thereof, for example, to modify such that they are rearranged in the order from the most-used data.

The facsimile apparatus of the invention registers data relating to a new destination by utilizing a nonstandard functional identification signal supplied from the destination. Thus, data such as its identification name and facsimile number can be registered very easily.

Furthermore, in the invention, it is unnecessary to dial facsimile numbers at the time of transmission data, and also destinations which are infrequently accessed can be reliably erased since the number of times at which the registered data are accessed is always renewed, rearranged in alphabetic order or in the order of the Japanese syllabary, and displayed.

In addition, the invention is applicable not only to facsimile apparatuses, but also to a communication apparatus such as a radio pager.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A facsimile apparatus for receiving identification data, for identifying a particular destination terminal, at time of transmitting document data to the destination terminal via a telephone line, comprising:

memory means for storing, as a data pair, a facsimile number input by manual dialing, and corresponding identification data returned from the destination terminal;

control means for controlling said memory means to automatically store, as the data pair, the facsimile number input by manual dialing, and the corresponding identification data returned from the destination terminal in response to said manual dialing;

display means for displaying the identification data stored in the memory means;

selection means for selecting one of the identification data displayed on the display means;

line connecting means for reading out a facsimile number stored in the memory means and corresponding to the selected identification data, and connecting the facsimile apparatus to a telephone line corresponding to the read-out facsimile number.

2. The facsimile apparatus according to claim 1, wherein the memory means has first memory area means for storing a number of times at which each destination terminal is connected to the facsimile apparatus via a corresponding telephone line.

3. The facsimile apparatus according to claim 2, further including means for enabling the memory means to erase one set of data from a portion of said first memory area means which is least accessed when the first memory area means of the memory means is full, and to store a new facsimile number and identification data corresponding to the new facsimile number in said portion of the first memory area means from which the least-accessed data set has been erased.

4. A communication apparatus comprising:

memory means for storing a plurality of data pairs, each data pair comprising identification data and a telephone number corresponding to the identification data;

rearrangement means for rearranging all the data pairs stored in said memory means in a predetermined manner based on the identification data;

designation means for successively designating a plurality of identification data from among the data pairs rearranged by said rearrangement means, the designated data pairs being fewer in number than the rearranged data pairs;

display means for displaying the plurality of identification data designated by said designation means;

selection means for selecting one of the identification data displayed on the display means; and line connecting means for connecting the communication apparatus to a telephone line so as to reach a destination terminal having a telephone number corresponding to the identification data selected by said selection means; and wherein said memory means includes first memory area means for storing a number of times which each destination terminal is connected to the communication apparatus via a corresponding telephone line.

5. The communication apparatus according to claim 4, further including means for enabling said memory means to erase one set of the data pairs from a portion of said first memory area means which is least accessed when said first memory area means of said memory means is full, and to store a new telephone number and identification data corresponding to the new telephone number in said portion of said first memory area means from which the least-accessed data pair has been erased.

6. A facsimile apparatus for receiving identification data, for identifying a particular destination terminal, at the time of transmitting document data to the destination terminal via a telephone line, said apparatus comprising:

memory means for storing, as a data pair, a facsimile number input by manual dialing, and corresponding identification data returned from the destination terminal;

control means for controlling said memory means to automatically store, as the data pair, the facsimile number input by manual dialing, and the corresponding identification data returned from the destination terminal in response to said manual dialing;

rearrangement means for rearranging all the data pairs stored in said memory means in a predetermined manner based on the identification data;

designation means for successively designating a plurality of identification data from among the data pairs rearranged by said rearrangement means;

selection means for selecting one of the identification data displayed on the display means; and line connecting means for connecting the facsimile apparatus to a telephone line so as to reach a facsimile number corresponding to the identification data selected by said selection means.

* * * * *